3,748,288
PROCESS FOR PREPARING SUBSTANTIALLY NON-LUSTROUS OPEN PORE POLYURETHANE FOAMS IN SITU AND FOAM PREPARED THEREBY

Joseph Winkler and Charles W. Bredbenner, Hazleton, and Lawrence G. Adlum, Conyngham, Pa., assignors to Tenneco Chemicals Inc.
No Drawing. Continuation-in-part of application Ser. No. 121,593, Mar. 5, 1971. This application Dec. 27, 1971, Ser. No. 212,665
Int. Cl. C08g 22/44
U.S. Cl. 260—2.5 AH                                28 Claims

ABSTRACT OF THE DISCLOSURE

This invention provides a substantially nonlustrous, highly open polyester-type urethane foam by the addition of a minor proportion of a conventional polyether polyol reagent and a small amount of a hydrophobic, antifoaming organo-silicon compound. Preferably, a polyether-polyol type foam-stabilizing organo-silicon emulsifier is added. Pigments and other conventional additives can also be added if desired.

---

This application is a continuation-in-part of our application Ser. No. 121,593, filed Mar. 5, 1971.

Cellular solid polymers, often referred to as "foams," can be prepared by generating a gas during the polymerization of the liquid reaction mixture. The gas generated causes foaming of the reaction material which is normally in a plastic or liquid state. The polymerization reaction continues while the foaming occurs until the polymer sets or gels into the cellular pattern formed by the foam bubbles. The solidified polymer thus becomes a cellular solid mass popularly, although somewhat inaccurately, known as a "foam." Polyurethane foams are generally prepared by the reaction of an active hydrogen-containing compound as determined by the Zerewitinoff method, the most common containing predominantly hydroxyl groups, and a polyisocyanate, in the presence of a blowing agent such as water, and usually, a reaction catalyst and foam stabilizer.

The cellular solid polymer comprises a skeletal framework of relatively heavy strands forming an outline for the cell structure. The strands of the skeletal framework are conventionally connected by very thin membranes, or windows, which form the walls of the cells. In open-celled foams, some or most of the windows are missing, or open or torn, in each cell thus forming an interconnecting network open to fluid flow.

Furthermore, for many purposes, the appearance of reticulated open-cell foam has been superior to the less open as-polymerized, foam. When the foam is used, i.e., as an insulating liner for fabrics, the intact cell walls, or windows, create an undesirable sparkling quality, or luster, which can shine through the fabric unless an expensive closely knit or woven fabric is used.

In the commercial, flexible polyester-type polyurethane foam, a proportion of the cell walls rupture spontaneously during foaming, thus forming a porous cellular solid, known as an open-celled foam. Such open-celled foams, however, generally are not sufficiently porous or open-celled to permit the passage of fluid as would be necessary for use as filters or as a baffle, or diffuser, to prevent explosions. Accordingly, in attempting to improve the properties of such open-celled foams in a desired direction, the art has tried various post-forming methods of reticulating, or increasing the degree of openness, by breaking or removing the residual cell windows of such foams. These reticulated open-celled foams are made more porous to fluids, as would be expected, may have a different density and usually a generally increased softness, or soft feel, of the foam. For example, means for removing cell walls have been suggested using the hydrolyzing action of water in the presence of an alkali metal hydroxide. By carefully adjusting the conditions during the hydrolysis reaction, it has been proposed that all of the cell windows are removed without adversely affecting the skeletal framework. Reticulation can also be carried out by melting the windows, e.g., a high temperature air flow to heat the cell windows or walls to above the melting point of the polymer. Again, allegedly, by carefully regulating the conditions under which this process is carried out, the cell windows can be melted without adversely affecting or melting the skeletal strands.

Various purely mechanical means to reticulate both flexible and rigid foams have also been suggested. For example, the art has utilized a procedure of mangling or wringing a flexible foam to open the pores to render it more useful as a sound insulating or sound absorbing medium. Foams have been made more open, to improve sound absorbing properties, by heating with super-heated steam at 140° C., or by blowing with compressed air or high velocity liquids.

Whatever post treatment is used, it must of necessity produce some effect upon the stalk or skeletal structure of the foam regardless of how minimal such effect is. In many cases, when working with a pigmented foam, the color intensity is substantially decreased by the post-polymerization reticulation treatment. This requires the additional step of applying a surface colorant. Accordingly, a method for producing a substantially open-celled non-lustrous foam in situ during the reaction or foaming process, without the necessity of an additional post polymerization treatment step would be extremely useful.

The art has been at least partially successful in obtaining open-celled polyether type polyurethane wherein the polyurethane is prepared using a polyhydric polyether as the active hydrogen-containing reactant. For example, in U.S. Pat. No. 3,433,752 an open-celled, rigid, polyether polyurethane foam is produced by the addition of an alkali metal salt of an o-sulfonated high molecular weight fatty acid. In Canadian Pat. No. 797,893, the preparation of a polyalkylene ether polyurethane having an open structure is disclosed which includes the addition of a petroleum hydrocarbon liquid, e.g., kerosene or mineral oil, as a cell opening agent which causes the cell membranes of the foam to rupture during the foaming process thus allegedly providing an open material. The intent of this process is to prevent shrinking of the foam during cooling which often occurs with a substantially fully closed cell structure. However, the above process is explicitly limited to polyalkylene ether polyurethane and does not result in a completely open structure, but merely one in which sufficient membranes are removed to permit at least some fluid permeability throughout the internal foam structure. Also see U.S. Pat. No. 3,454,504.

In Canadian Pat. No. 797,892 an allegedly 100% open-celled polyether polyurethane foam material is obtained by the reaction of a polyhydric polyether compound with an organic polyisocyanate and blowing agent in the presence of an inert organic liquid solvent such as methylene chloride, acetone, hexane or pentane.

U.S. Pat. No. 3,178,300 describes a process allegedly for preparing "skeletal" polyurethane foam by mixing an organic polyisocyanate with castor oil in the presence of an alkyl silane oxyalkylene block copolymer (a surfactant), a blowing agent and a monohydric organic compound, such as a monohydric alcohol or monocarboxylic acid. This material is described as useful only as a filter. It has a limited usefulness, however, because of the low structural strength caused by the chain-stopping monohydric additive, which limits its strength, and the relatively coarse cell structure. It would not, therefore, be useful for textile lamination. Further, castor oil is notoriously difficult to use as a sole polyhydroxy reactant. The reaction with castor oil is highly exothermic often causing scorching or even burning of the foam, and often the formation of odoriferous by-products. The foam product would be too rigid to be useful for textile lamination.

U.S. Pat. No. 3,165,483 describes a process for making a skeletal foam by reacting a polyisocyanate with either castor oil or a polyhydric polyether in the presence of a silane-oxyalkylene block copolymer and of an unreactive hydrocarbon or halohydrocarbon, ester, aldehyde and/or ketone. These materials are also indicated to be useful as filters.

In the preparation of urethane foams various silicon-type surfactants have been utilized because of their strong surface activity and, depending on the type of silicon surfactant, their emulsifying power, their ability to promote cell nucleation, and their foam stabilizing property. In the preparation of slab-stock foam, on a continuously moving, generally open-topped and/or open-ended, conveyor, the substantially continuous, instantaneous foaming reaction requires an additive with a high-degree of emulsifying power. However, when preparing poly-ether type foam in a closed mold, emulsification is not needed, and a hydrophobic surface active organo-silicon polymer, which serves primarily as a cell nucleating agent, can be used. These hydrophobic silicon-type surfactants are free of hydrophilic and isocyanate-reactive groups, and include, for example, dihydrocarbyl siloxanes, such as dimethyl siloxane. A treatise on various types of organo-silicon additives for foam has been published: "How Silicone Surfactants Affect Polyurethane Foams," by Boudreau, Modern Plastics, January 1967, pages 133 through 135, 138, 143, 144, 147, 234, 239 and 240.

The use of hydrophobic dimethyl siloxane oils has been suggested as a nucleating agent for polyether-type polyurethane foams, and even as a foam stabilizer for polyether-type urethanes prepared in a closed mold, where an emulsifying, hydrophilic surfactant was not needed. However, in the usual commercial polyester-type polyurethane foams prepared by a continuous slab-stock method, such hydrophobic silicone oils cause a breakdown in the foam structure and collapse of the foam when present in even minute quantities, e.g. as low as 0.1% by weight of the polyhydric resin component, in the polyester isocyanate formulations usually used in the continuous slab-stock process. In very minute, or trace, quantities, the dimethylsiloxane-type of silicone oils can result in the formation of an extremely coarse, nonuniform foam of a type suitable only for the production of synthetic sponge.

A most useful general treatise on polyurethane systems is set forth in Polyurethanes; Chemistry and Technology, by Saunders and Frisch, published by Interscience Publishers (New York, 1964).

In carrying out the urethane foaming-polymerization reaction, the art has long recognized the need for, and the difficulty of maintaining, a suitable balance among all of the various agents present with the reactants such that a foam of a desired density and consistency is obtained having substantially uniform cell sizes which have a pleasing appearance to the eye. For certain uses, such as for sponges or filters, on the other hand, non-uniform or coarse cell sizes are permitted, or even desirable; for such purposes minute amounts of borax, high molecular weight hydrocarbon oils or other cell enlarging agents can be used to produce an extremely coarse and irregular, but highly open, foam structure. However, such products are not useful for such premium purposes as clothing lining, insulation materials, for medical uses, such as in bandages, for cosmetic uses, such as powder puffs, and as fine grade filters.

The polyester-type polyurethane foams have been found to be especially useful for certain purposes because of their greater resiliency and strength compared to the polyether-type foam. One major area of use is in the preparation of insulating foam linings for fabrics. For such purposes polyesters are useful because they can be readily "peeled" into the thin sheets needed.

In accordance with this invention a highly porous, open-pore, substantially membrane-free, nonlustrous foam can be prepared from the reaction of a polyhydroxy-containing poleyster and water with an organic polyisocyanate in the presence of a catalyst and a hydrophilic foam-stabilizing emulsifier-surfactant by the combined use of a minor quantity of a polyether polyol reactant and a hydrophobic, antifoaming organo-silicon compound, such as a polysiloxane. Preferably, the emulsifier-surfactant is a hydrophilic organo-silicon polymer designed and adapted for use in the preparation of urethane foam from a polyether polyol and an organic polyisocyanate and water.

The surprising effect of this invention, the long sought after in situ preparation of a nonlustrous, open-celled, substantially membrane-free polyester-type urethane polymer foam, is thus achieved by replacing a minor proportion of the polyhydric polyester reactant with an equivalent amount of a polyether polyol, and adding a hydrophobic antifoaming organo-silicon polymeric compound. As a further surprising incident of this invention, the emulsifier-surfactants which are preferably utilized and which give the consistently best results, are the hydrophilic organo-silicon polymers designed and adapted for use in the preparation of foam from a polyether and an organic polyisocyanate and water.

Further, the product prepared in accordance with this invention is a non-lustrous, substantially open foam, substantially free from membranes or the shattered remains of membranes, and comprises a mixed polyester-polyether urethane polymer prepared from a polyester and a minor quantity of a polyether and containing the resides of a hydrophilic organo-silicon emulsifier surfactant and of a hydrophobic, antifoaming organo-silicon compound.

The process of this invention can be carried out utilizing the one-shot method, the quasi-prepolymer method or the prepolymer method. The polyether polyol should be present in a proportion of at least about 5% by weight of the total polyol reactants, i.e., polyhydric polyester plus polyether polyol. Generally not more than about 35% polyether polyol by weight of the total polyol should be used. Preferably from at least about 10% and only up to about 25% by weight polyether polyol should be present in the polymerization reaction mixture. Generally, too high a proportion of the polyether polyol results in a foam which is too soft, or "punky." If desired, the hydrophobic organo-silicon compound can be premixed with the polyether polyol and the combination added to the reaction mixture together.

The hydrophobic organo-silicon compounds useful with the present invention are those which preferably do not affect the chemical reaction between the polyisocyanate, the polyhydric compounds and water. Hydrophobic organic-substituted polymeric silicon compounds, such as the silicone oils, are well known to the art. The silicone oils have previously been used in the preparation of urethane foam in a closed mold, see the article by Boudreau, January 1967 issue of Modern Plastics, supra. These silicone oils are generally hydrophobic and inert in the environment of the polyurethane foaming reaction. The useful silicone compounds include nonpolymeric compounds, e.g., having the structure, $R_3Si$—$OSi$—$R_3$, but preferably are polymeric compounds containing the recurrent group $(-R_2SiO-)_n$. Although there is no theoretical maximum molecular weight for such polymeric silicone compounds, the silicone compounds most useful in this invention are preferably oily, or fluid, materials, rather than resinous or rubbery, solid materials; therefore, the molecular weight is limited by the allowable viscosity. The viscosity of such oily hydrophobic silicon compounds useful in the present invention is limited only by the requirement that they be uniformly and finely dispersable throughout the reaction mixture during the foaming reaction. Accordingly, on a practical basis, a silicon compound oil having a viscosity greater than about 60,000 cs. at 25° C. has been found to be not generally useful when working with the usual commercial mixing apparatus. However, high viscosity oils or even finely divided solids can be used if non-conventional, and more effective dispersion equipment is available. Generally, in the above formula, $n$ can be up to about 100, although if desired higher values can be used as explained above. Preferably, $n$ is from 2 to about 20.

The commonly available silicone oils are polymers which have the structure,

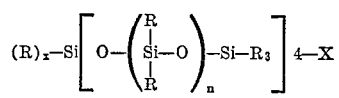

Other, less preferred organo-silicon compounds include the polysilazanes and the polysiloxanylsulfates which have the following formulas, respectively:

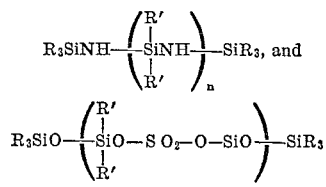

Other types of organo silicon compounds include the reaction product of siloxanes containing at least one silanic hydrogen bond with an organic compound having ethylenic or acetylenic unsaturation as is disclosed in U.S. Pats. Nos. 2,970,150 and 3,577,362 (polyvinylsilanes).

In the above formulas, the various R and R' groups can be any hydrophobic organic groups, and can be the same group or a mix of groups in the polymer molecule. The R, R' groups are connected to the silicon atom through a carbon atom, and include aromatic, heterocyclic, aliphatic and cycloaliphatic groups. In the most commonly available and, therefore, the least expensive and most preferred of the hydrophobic silicone compounds useful in accordance with this invention, the R and R' groups are primarily hydrophobic hydrocarbon groups of up to about 20 carbon atoms, and preferably up to about 12 carbon atoms. Generally, commercially available silicone oils contain R groups containing from about 1 to about 7 carbon atoms. Inertly substituted such hydrocarbon R groups can also be used, such as halosubstituted groups.

The preferred hydrocarbyl groups are those which are completely inert in the reaction mixture and are preferably saturated aliphatic and saturated cycloaliphatic groups and aromatic groups. Inertly substituted such groups are also most useful. Groups which might eventually react with certain components in the urethane reaction mixture, if left in contact for a sufficiently long period, can be present in the silicone anti-foamant if they will not affect the course of the foaming and polymerization reactions nor cause degradation of the final foam product and if care is taken not to mix the anti-foaming agent with any reactive material until immediately before the foam is prepared.

Useful hydrocarbyl groups include, for example, alkyl groups such as methyl, ethyl, isopropyl, n-butyl, n-octyl, 2-ethylhexyl, and n-dodecyl groups; alkenyl groups, e.g., vinyl and allyl; cycloalkyl groups, e.g., cyclohexyl; aryl groups, e.g., pheny and naphthyl; aralkyl groups, e.g., benzyl and phenylethyl groups; and alkaryl groups, e.g., tolyl, xylyl, ethylphenyl, and n-hexyl-phenyl groups. The hydrocarby groups can be inertly substituted, with, for example, fluorine, without changing the siloxane function according to the present invention.

Generally, these anti-foaming agents have a powerful effect on the polyurethane foaming reaction and only very small quantities can be sufficient. As with all aspects of urethane foam production, the art will recognize that a balancing of agents is necessary, including the anti-foaming agents, the catalyst (or catalysts) present and the foam-stabilizing emulsifier. However, it has been found that as little as 10 parts of anti-foaming agent per million parts of polyhydric resin reactants, i.e., polyester plus polyether and water can improve the porosity and decrease the lustre of the foam when used in the present invention in combination with the minor quantity of polyether. Also, generally more than about 10 parts of anti-foamant per hundred of polyhydric resin is unnecessary and increases the risk of causing complete collapse of the foam. Most generally, at least about 0.1 part, and preferably not more than about 3 parts anti-foamant per hundred parts of the polyhydric resin reactants have been found most effective in the present invention.

The polyester polyol reactants useful in the present invention include any conventionally used in the preparation of flexible and semi-flexible urethane polymer foams. The polyhydric polyester reactant usually has a molecular weight of at least about 400 and optimally between about 500 and about 5000. The hydroxyl number of the compound is correspondingly in the range of from about 15 to about 300. Generally a polyester having a molecular weight of greater than about 10,000 is difficult to handle commercially because of the difficulty of completely mixing such a high viscosity compound into the reaction mixture. However, in circumstances where a high molecular weight reactant is desired and where the suitable powerful mixing apparatus is available, the higher molecular weight compound can be used; the only significant limitation is that the compound contain at least two active hydrogen groups, preferably hydroxyl groups. The preferred hydroxyl functionality for the polyester resins is from 2 to about 3.0.

The range of polyester polyol compounds useful for preparing the polyurethane foams in the present invention are well known to the art and can be prepared by, for example, the reaction of a polyhydric alcohol with a polycarboxylic acid compound, each containing from two to about 36 carbon atoms in the molecule. The polycarboxylic acid includes such acid precursors as the corresponding acid anhydrides or acid halides or even, for example, alkyl esters. The preferred acids are the dicarboxylic acids containing from about 4 to about 12 carbon atoms in the molecule. Examples of such preferred carboxylic acid compounds which can be used include, for example, aromatic acids such as phthalic acid, terephthalic acid, isophthalic acid, tetrachlorophthalic acid, cycloaliphatic acids such as dimerized linoleic acid, maleated and fumarated rosin acids and cyclohexane-1,4-diacetic acid, but especially the aliphatic acids such as tricarballylic, oxydipropionic, succinic, glutaric, adipic, azelaic, suberic, sebacic acids, or combinations of such acids. The polyester polyols can also be prepared from corresponding lactones, such as $\gamma$-butyro; or $\epsilon$-caprolactones, for example.

The polyhydric alcohol used in the preparation of this polyester polyol is generally a mixture of a dihydric and a trihydric, or polyhydric alcohol of high hydroxyl value. Preferably, a mixture of polyols, the major portion having a functionality of two and the minor a functionality of three is used. This mixture of di- and tri-functional polyols is utilized to give an average functionality of between two and three. A functionality of greater than two is desirable to provide cross-linking in the reaction between the polyester polyol and the polyisocyanate to form a flexible, but strong foam. It has been found to be preferable to obtain this additional functionality by using trihydric or higher polyols in a minor amount when forming the polyester polyol.

For preparing flexible foams, the polyols most preferably include the glycols, such as neopentyl glycol, ethylene glycol, diethylene glycol, hexamethylene glycol, 1,4- and 1,3-butylene glycol, 1,3- and 1,2-propylene glycol and the corresponding dipropylene glycols. The most useful monomeric triols include the aliphatic triols, such as trimethylolethane, trimethylolpropane, 1,2,4-butanetriol, 1,2,6 - hexanetriol, glycerol, and triethanolamine. Aromatic polyols can also be used, such as trihydroxymethyl benzene.

It is recognized that certain compounds which are considered by those skilled in the art as polyester resins also contain ether linkages, e.g., esters prepared from dipropylene glycol. However, the primary character of such resins is considered to be that of an ester.

The organic polyisocyanates useful in the present invention are also conventional. They contain at least two isocyanate groups per molecule. Preferably, the isocyanate mixture selected has an isocyanate functionality of from about 2 to about 3.0. The useful isocyanates include for example the aromatic, aliphatic, cycloaliphatic and heterocyclic polyisocyanates.

Suitable organic polyisocyanates include, for example, n-butylene diisocyanate,
methylene diisocyanate,
m-xylylene diisocyanate,
p-xylylene diisocyanate,
cyclohexyl-1,4-diisocyanate,
dicyclohexylmethane-4,4'-diisocyanate,
m-phenylene diisocyanate,
p-phenylene diisocyanate,
3-(alpha-isocyanatoethyl)-phenyl isocyanate,
2,6-diethylbenzene-1,4-diisocyanate,
diphenyldimethylmethane-4,4'-diisocyanate,
ethylidene diisocyanate,
propylene-1,2-diisocyanate,
cyclohexylene-1,2-diisocyanate,
2,4-toluylene diisocyanate,
2,6-toluylene diisocyanate,
3,3'-dimethyl-4,4'-biphenylene diisocyanate,
3,3'-dimethoxy-4,4'-biphenylene diisocyanate,
3,3'-diphenyl-4,4'-biphenylene diisocyanate,
4,4'-biphenylene diisocyanate,
3,3'-dichloro-4,4'-biphenylene diisocyanate,
1,5-naphthylene diisocyanate,
isophoron diisocyanate.

The aromatic diisocyanates are generally the least expensive and most reactive polyisocyanates available and, therefore, are preferred. The aromatic diisocyanates, especially the toluylene diisocyanate isomers are used commercially in the preparation of foam by the one-shot, continuous slab-stock process. However, for certain purposes, other polyisocyanates, especially the aliphatic, aralkyl and cycloalkyl polyisocyanates have valuable properties and can be used alone, or, if desired, in admixture with, e.g., toluylene diisocyanates. The aralkyl, aliphatic and cycloaliphatic polyisocyanates are especially useful when resistance against degradation and discoloration due to oxidation or light is needed. The aralkyl polyisocyanates are generally not useful alone, but can be used in combination with the other types for special purposes.

Generally, in carrying out the urethane polymerization reactions, the only significant groups in the reactant compounds are the isocyanate groups and active hydrogen groups which are reactive therewith. Any other group can be present in the reactants and in the urethane polymer, so long as the group does not interfere with the basic isocyanate-active hydrogen reaction. Acyclic, alicyclic, aromatic and heterocyclic radicals are all possible substituents on the active hydrogen and polyisocyanate reactants.

In the process of the present invention, where both a polyether polyol and polyester polyol are used, the polyether polyol can also be selected from any of the wide variety of polyhydric polyether compounds available and conventionally used by the art for the preparation of polyether-type polyurethanes. The most common polyether polyol compounds, the polyoxyalkylene polyether polyols, are generally prepared by the reaction of an alkylene oxide with a polyhydric monomer. The polyhydric monomer can be selected from among the same polyhydric alcohols recited above for use in preparation of the polyester; preferably, however, a higher average functionality is useful for a polyether polyol. Therefore, a higher proportion of trihydric polyols, such as glycerol, trimethylolethane and trimethylolpropane, or polyols with more than 3 hydroxyls, such as pentaerythritol, arabitol, sorbitol and xylositol are presently used in the mixture of monomers used to prepare the polyether polyols.

The alkylene oxides used in preparing the polyethers preferably are these which contain from two to about four carbon atoms, for example, ethylene oxide, 1,3-propylene oxide and 1,2-butylene oxide, and homopolymers and copolymers thereof. Other reactants can also be used in preparing the polyhydric polyalkylene ether, such as glycidol and cyclic ethers like di- and tetramethylene ethers, and epihalohydrins, e.g., epichlorohydrin.

Also useful are the polyaralkylene ether polyols which are derived from the corresponding aralkylene oxides such as for example styrene oxide, alone or mixed with alkylene oxide.

Generally, propylene oxide, i.e., the 1,2-propylene oxide, and mixtures of 1,2-propylene oxide with ethylene oxide are preferred for the preparing of the polyether polyol reactant.

The polyethers for use in the present invention preferably have a molecular weight of from about 2000 to about 4500 and optimally of from about 2800 to about 3800 and a hydroxy functionality of at least 2.0 to about 8.0, and preferably an average hydroxy functionality of from about 2.5 to about 5.0.

Further examples of the above conventional reactants are available in the literature. See, for example, Saunders and Frisch, supra.

Generally, the one-shot technique is preferably employed for the production of flexible urethane foams, however, in certain cases, the pre-polymer and quasi-prepolymer techniques can also be employed for the flexible type foams.

It is recognized in the art, that the preparation of commercially useful foam requires the careful balancing of a large number of factors, including not only the primary rectants recited above, but also the catalyst, surfactant, temperature, speed of feeding of the foaming mixture and other reaction conditions. In the process of the present invention, however, the proportion and type of antifoaming compound is an added factor which must be included in the balance. The general procedures and problems of providing a balanced mixture are well known to those skilled in the art. It is a matter of routine to those so skilled to prepare a balanced formulation for use in a given process and with available apparatus.

For example, the proportions of the polyisocyanate reactant to the total polyhydric reactants, including water, can be varied as one means for changing the properties of the urethane foam desired. Usually, the total (—NCO) equivalent to total active hydrogen equivalent, i.e., polyether and polyester hydroxyl plus water, should be such as to provide a ratio of from about 0.70 to about 1.3 equivalents of —NCO per equivalent of active hydrogen, preferably a ratio of from about 1.0 to about 1.1 equivalent of —NCO per reactive hydrogen. Different ratios can be used; preferably, however, usually an excess of the isocyanate reactant is used in order to obtain a fully polymerized stable useful product. Foam having specifically desired properties often require the use of less than 1.0 equivalent of —NCO, for example, a hydrophilic foam; in this case an equivalence of 0.2 can be used when using a higher polyhydric alcohol.

The preferred foaming agent for general use in the production of polyurethane foam is water; water is a reagent that enters into the urethane polymerization reaction, with or without a secondary foaming agent, depending upon the desired final density of the foam. The water reacts with the isocyanate and releases carbon dioxide as a volatile by-product. Therefore, water must be included with the hydroxyl compounds when computing the —NCO-to-active-hydrogen ratio. Generally, when water is used, it is present in proportions of from about 0.5 to about 6 weight percent of water based on the total weight of the reacting polyols. Blowing agents, which do not react with the isocyanate can be used, usually as an adjunct with water. These include compounds which are vaporized at the temperatures produced by the exotherm of the isocyanatereactive hydrogen reaction. The various blowing agents are well known in the art and consitute no part of the present invention. Other blowing agents that are preferably used by the art include certain halogen-substituted aliphatic or cyclo aliphatic hydrocarbons having boiling points between about —40° C. and +70° C., including methylene chloride, the Freon fluorocarbons, such as trichloromonofluoromethane, dichlorodifluoromethane, and 1-chloro- 2-fluoroethane; low boiling hydrocarbons such as m-propane, cyclopropane, butane, isobutane, pentane, hexane, cyclohexane and their mixtures and the like, and various thermally unstable compounds which liberate gases, e.g., $N_2$, upon heating, such as N,N'-dimethyldinitrosoterephthalamides, are sometimes employed.

The amount of foaming agent present is varied to obtain the desired density of the foamed or cellular polymer product. Such proportions are well known to the art and are no part of the present invention. However, it is generally stated that for each hundred grams of reaction mixture containing an average isocyanate/reactive hydrogen ratio of about 1-to-1, about .005 to .03 mol of gas, such as the $CO_2$ released by the water-isocyanate reaction and/or vaporized Freon type blowing agents, can be used to provide densities ranging from 30 lbs. to 1 lb. per cubic foot respectively.

Commercially, a catalyst is usually employed in the process of preparing a foamed polyurethane. Generally, a combination of two catalysts is conventionally used to catalyze two separate reactions which occur when using water as the foaming agent. A first catalyst is for the polymerization reaction between the isocyanate and the hydroxy compound, a second catalyst is for the blowing reaction between water and the isocyanates. The various catalysts useful for each type of reaction are well known in the art, see, for example, Sanuders and Frisch, supra. It is commonly understood that tertiary amines are effective and tend to favor reaction of isocyanate with water and that transition metal salts, and complexes, favor the polymerization reaction with the polyol.

The most preferred metal catalysts include tin compounds and iron compounds. Other metal compounds which can be used include compounds of cobalt, lead, vanadium, chromium, tungsten, antimony and titanium.

Examples of tertiary amine catalysts include triethylenediamine, N-ethylmorpholine, N,N,N',N'-tetramethyl-1,3-butanediamine and bis 2-(N,N-dimethylamino)ethyl ether and other such compounds.

Useful tin compounds include stannous salts, e.g., stannous octoate, stannous acetate and stannous oleate, also stannic salts e.g., stannic diacetate, stannic dioctoate, and the covalently linked organotin compounds such as dibutyltin, diacetate, and tributyltin oxide. Mixtures of the tertiary amines are generally used commercially; preferably a mixture of a tertiary amine catalyst and tin compound is used.

Each type of catalyst, if present, is generally added in amounts of from about .05 to about 2 weight percent and preferably from about 0.1 to about 1 weight percent, based on the total weight of the active hydrogen-containing compounds present in the reaction, i.e., the polyester polyol and the polyether polyol.

It is conventional wisdom in the art, as discussed, for example, in Saunders and Frisch, supra, to utilize a foam-stabilizing emulsifier-surfactant and foaming agent in balanced proportions to obtain a foam of a desired cell size, structure and density. Generally, the emulsifier-surfactant is balanced with the amounts of catalyst and water to obtain the desired foam.

In the present invention, the emulsifier-surfactant is also balanced-off against the anti-foaming hydrophobic silicone compound used to obtain the open cell, nonlustrous product in a desired foam structure and density.

The emulsifier-surfactants suitable for use in the present invention are organo silicon compounds, usually polymers, which are hydrophilic and preferably water-soluble as well as soluble in at least one of the polyols. Such organo silicon surfactant-emulsifiers are well known to the art, described extensively in the published literature, and sold commercially. The commercially available organo silicon surfactant-emulsifiers are generally sold with specific instructions as to their suitability for polyether polyol-type or polyester polyol-type urethane foam production. Generally, a surfactant-emulsifier suitable for one polyol type is not suitable for use in a foaming reaction based on the other type. Further, these surfactant-emulsifiers are proprietary products, sold without disclosure as to their precise chemical structure. However, the surfactant-emulsifiers used for polyether polyol-containing reaction mixtures are known to depress the surface tension to a greater extent than do the organo silicon surfactants used with polyester polyols.

In the process of the present invention, however, where the urethane foam is prepared from a reaction mixture containing as the major portion of the polyol reagent a polyester polyol, it is surprising that the surfactant-emulsifiers which are most effective, include the type usually used with polyether polyols.

The most generally available organo silicon emulsifier surfactants are polymers which contain a plurality of silicon atoms (which form part of the hydrophobic portion of the polymer molecule) and a long chain hydrophilic group, for example, including a polyoxyalkylene ether group. In the more common organo silicon emulsifier surfactant compounds, the silicon is present as a siloxane group, i.e.,

A wide variety of molecular structures incorporating these two necessary elements, i.e., the long chain hydrophilic group and silicon atoms, have been used. For example, a first type of structure is a polymer containing a chain of siloxane groups, i.e.,

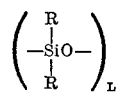

forming a backbone or spine of the molecule, to which are attached as pendant, or branched, chains, one or more long chain hydrophilic groups, i.e., as one of the R groups. In a second type of structure, a chain of alternating siloxane and hydrophilic, e.g., oxyalkylene, groups form a backbone or spine of the molecule. In a third, somewhat less common, type, the molecular spine is formed by a carbon chain, to which are attached pendant groups containing a silicon atom and a long chain hydrophilic group.

Other connecting groups can also be present in the above types of silicon-hydrophilic group-containing polymers; these include, for example, alkylene groups, carboxyl groups, carbamyl groups and amino groups.

The first type of polysiloxane backbone polymer can be represented by the following formula:

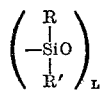

wherein L represents the number of siloxane groups and can be a number equal to at least two. Generally L is not greater than 100, but usually is a number from about 5 to about 20. At least one of R and R' in the molecule is a long chain hydrophilic group, such as for example a group including a polyoxyalkylene group $$(C_pH_{2p}O)_m$$

wherein $m$ is the number of oxyalkylene units, which can be connected to the silicon atom through a linking group such as an alkylene group or an oxygen atom. $p$ can be a number from two to about six, but preferably the group contains oxyethylene units, i.e., $p=2$, optimally in admixture with oxypropylene or other oxyalkylene units. Thus, optimally, $p$ is an average value depending upon which oxyalkylene units are present and in what proportion.

The remaining R and R' groups are hydrophobic groups, preferably hydrocarbyl groups. The hydrocarbyl groups include those which contain up to about 20 carbon atoms, but preferably are selected from the group consisting of lower alkyl groups of up to about six carbon atoms, cycloalkyl groups of about five to about seven carbon atoms and aryl, aralkyl or alkaryl groups of from about six to about twelve carbon atoms. However, in the commercially available materials R is generally methyl. Other hydrocarbyl R and R' groups include, for example, ethyl, n-propyl, isopropyl n-butyl, phenyl, o-tolyl, cyclohexyl and 2-methylcyclohexyl.

Examples of this first type of organo silicon emulsifier surfactant include compounds having the following general formula:

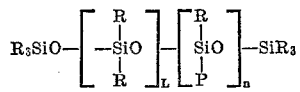

wherein P is selected from the group consisting of $$—O(C_pH_{2p}O)_mA$$

and $(C_{p'}H_{2p'}O)(C_pH_{2p}O)A$.

The second type of polymer, wherein the hydrophilic group is part of the spine or backbone of the polymer, includes compounds having the general formulas, for example:

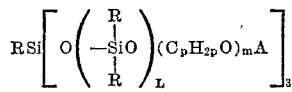

or

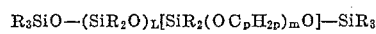

and

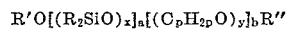

In all of the above formulas A is a hydrogen, a lower alkyl or a carboxyl group, containing up to six carbon atoms, such as butyl and acetyl, $n$ is at least one, need not be more than about thirty, and preferably is two to about twenty, and $m$ is at least two, is generally not more than about 100 and preferably from 15 to about 50. $p$ is a numuber from two to about six and is preferably two to four, optimally an average value between two and three; L is the number of siloxane units and is at least two; $n$ and L units may be in blocks or as a random copolymer; R, R' and R'' are hydrocarbyl groups, preferably lower alkyl of from 1–10 carbon atoms; R' and R'' are monovalent terminating groups: R' can be an alkyl group of from 1 to about 10 carbon atoms when attached to a siloxane group, and R'' can also be a hydrogen atom when it terminates a polyoxyalkylene group; $x$ is an integer of at least 2, and preferably up to about 20; $y$ is an integer of at least about 5, and preferably up to about 20; $n$ is from 2 to about 4; and $a$ and $b$ are integers and preferably of from about 2 to about 20 each.

The above compounds and other related equally useful polymers are more fully described in U.S. Pats. Nos. 2,834,748, 3,145,185, 3,398,104, 3,402,192, 3,505,377, 3,525,705, 3,600,418, 2,970,150 and 3,230,185.

Other hydrophilic organo silicon-oxyalkylene copolymers useful as emulsifier surfactants are described in Belgian Pat. No. 743,889, which contains an oxalkylene group joined to silicon through carbamate group, i.e.,

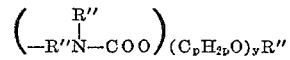

or through a carboxyl group.

Other organo silicon emulsifier surfactants, are disclosed in Canadian Pats. Nos. 873,390, 860,995, 849,038 and 851,239; U.S. Pats. Nos. 3,541,031, 3,404,105, 3,230,185, 3,278,465, 3,577,362 and 3,165,843. Pats. Nos. 873,390, 3,404,105, 3,278,465, 3,230,188 and 3,165,-843 (Example 4), especially show those polymers particularly adapted to use as emulsifier surfactants with polyether polyols. Also see the Boudeau article in the January 1967 issue of Modern Plastics, supra, and the text on Urethane Polymers, by Sanders and Frisch, supra, and "Synthesis and Properties of Siloxane-Polyether Copolymer Surfactants" by Kanner et al., I&EC Product Research and Development, June 1967, 6, page 88.

The above-described emulsifier-surfactant organo silicon polymers generally contain a significant proportion of hydrophilic groups to render the compound water-soluble, and hydrophobic silicon groups which are oil-soluble. The presence of these opposing groups provide the surface active and emulsifying power of the material, which is the reason for selecting these materials. Contrary to this, the anti-foaming compound contains substantially no hydrophilic groups; therefore, such compounds tend to destroy the polymer foam, and have no emulsifying activity.

The hydrophilic organo-silicon surfactant-emulsifiers, such as the polysiloxane-oxalkylene copolymers can be present in amounts of from about 0.1 to about 5 percent by weight and preferably from about 1.0 to about 4 percent by weight based upon the total weight of organic polyhydric reactants, i.e., polyether and polyester polyols.

Other foam stabilizing emulsifiers available for polyester-polyol-type polyurethane foams can preferably be used in combination with the organo-silicon emulsifier-surfactants described above in the present invention. Such useful emulsifiers include, in particular, nonionic emulsifiers, such as oxyethoxylated tall oil, ethoxylated alkyl phenols, and some anionic surfactants, such as sodium lauryl sarcosinate, and various oil soluble sulphonates. It is also known that various materials useful as plasticizers in synthetic resin plastics tend to stabilize foam. Such materials include tricresyl phosphate; capped polyesters, e.g. the reaction product of a glycol, such as ethylene glycol, and a dicarboxylic acid, such as adipic acid, terminated by a monocarboxylic acid, such as acetic acid, or a monohydric alcohol, such as ethanol.

In addition, any of the various conventional pigments and fillers can be added including carbon black and the various white or color pigments. Such particulate fillers preferably have a particle size of from about 1 to about 50 microns. Pigments generally are present in amounts of from about 0.5 to about 15% by weight, based upon the total weight of the reaction mixture. For special purposes, highly filled foam containing 50 percent, or even more, filler has been used. Pigments or fillers are preferably added as dispersions, either in aqueous or non-aqueous dispersions. Although the particulate material can be added as powder to the urethane foam reaction mixture, it is more common practice to utilize the pre-dispersed commercially available materials.

Inhibitors against discoloration and aging, flame retardants and other materials can also be added if desired for the particular purpose for which a foam is to be used.

In carrying out the process according to this invention by the one-shot method, the various reactants and additives are fed to a mixing chamber in the desired ratios and speedily mixed in the chamber prior to being poured into a mold. The foam according to this invention can be prepared by any conventional process for preparing a polyester polyurethane foam, with the addition of the desired amounts of the polyether polyol and the before-described hydrophobic organo-silicon compound and polyether polyol type hydrophilic organosilicon foam stabilizer, or emulsifier-surfactant. Various continuous slab-stock processes are described which include forming the foam in buns having rectangular or round cross-section or even in toroidal shapes. For the preparation of the highly desirable round bun, see, for example, U.S. Pats. Nos. 3,281,894, 3,296,658 and 3,476,845, all to Buff et al. and No. 3,488,800 to Kornylak.

The following are examples of the process and the product prepared therefrom according to this invention; they are not intended to be exclusive of the full scope of this invention but merely set out certain preferred embodiments thereof.

In the following examples, the various foams prepared were tested in accordance with the standard tests described in ASTM D–1564 for testing the physical properties of polyurethane foams. In these tests air permeability was determined by measuring the air flow required to maintain a constant pressure drop of 0.5 in. $H_2O$ across a sample of foam 1 inch thick and 2 ins. x 2 ins. square. The greater the amount of air flow required in cubic feet per minute, to reach the required pressure drop, the greater the permeability. The "clickability" of the foams, a measurement of a foam's usefulness in die-cutting processes, was determined by placing a piece of foam 1 in. thick under a square die, 2½" x 2¼". A foam passes the click test if the die cut piece has sharp edges on all sides and if it retains its original thickness and shape after cutting.

The viscosities of the various polymeric organic silicon compounds described here are determined by the Brookfield method at the indicated temperature of 25° C.

EXAMPLE 1

The following materials were fed to a conventional foaming apparatus to form foamable polyurethane compositions in the continuous preparation of a rectangular bun.

| Ingredients | Comparative example | Example 1 |
|---|---|---|
| Poly(diethylene glycol adipate) (MW=2000) | 100 | 100 |
| Tolylene diisocyanate (80/20) | 45 | 50 |
| Ethoxypropoxylated polysiloxane (Viscosity at 25°C=1,700 cs.) (polyether type surfactant)[1] | 0 | 1.88 |
| Polyester-type polysiloxane surfactant[2] (viscosity at 25° C.=500 cs.) | 1.2 | 0 |
| Water | 0.30 | 0 |
| Tertiary amine | 0.8 | 0.375 |
| Stannous octoate | 0.05 | 0.25 |
| Carbon black aqueous dispersion (58% H²O) | 6.0 | 6.9 |
| Propoxylated glycerol; a (polyether)-triol (MW=3,500) | 0 | 25 |
| Polydimethylsiloxane (hydrophobic oil (viscosity=50 cs. at 25° C.) | 0 | 1.25 |

[1] Sold by Dow Corning Corp as DC–192, see product brochure Form No. 04–146. Typical physical properties are: refractive index, at 77° F., 1.4441; specific gravity, at 77° F., 1.032; color, less than 5 Gardner; cloud point (30% in water) 94° F.; pour point below —40° F.

[2] Sold by Union Carbide Corp. as L–532, see Product Information brochure F–42286A. Typical properties are: specific gravity, at 25/25° C., 1.003. cloud point, 1% aqueous solution, above 95° C.

The above ingredients were simultaneously metered to and blended in a conventional mixing head for foamable polyurethane reaction mixtures. The stirrer was operated at 4,000 to 6,000 r.p.m. The polydimethylsiloxane was predispersed into the polyether-polyol. The blended reaction mixture was fed to a release-coated paper-lined conveyor mold where the mixture was permitted to foam and solidify. Lengths of the molded foam were cut off at the end of the conveyor mold, for each formulation, and the physical properties thereof were measured after the foam had cooled to ambient temperature. Several lengths of each sample of foam was peeled into sheets 40 mils thick. Both samples were readily peelable in accordance with the preferred characteristics for polyester-type urethane foam. Similarly, when processed by commercial flame lamination techniques, both foams provided the characteristic polyester effectiveness in laminability to a woven cotton fabric.

The appearance of slices taken from the foamed samples were strikingly different. The comparative example, a conventional commercial foam, was a steel gray color and was extremely lustrous, having a sparkling appearance. The foam prepared according to the invention, Example 1, had a substantially dull, deep black color, substantially without any lustrous quality. Further, the peeled foam of the comparative example had a harsh feel, whereas the foam of Example 1 was soft and almost velvety.

The following physical properties were determined.

| | Comparative example | Example 1 |
|---|---|---|
| Density (lbs./ft.³) | 1.556 | 1.8 |
| Percent resilience | 27 | 41.7 |
| Air permeability, ft.³/min | <0.3 | 8.9 |
| Tensile strength (p.s.i.)†† | 32.2 | 21.2 |
| Elongation (percent) | 407 | 426 |
| Compression sets: | | |
| 90%—22 hrs., percent | 61.0 | 9.8 |
| 90%—6 hrs., percent | 13.0 | 6.4 |
| Cell count | 50 | 48 |
| Clickability | None | Excellent |

The permeable, substantially nonlustrous, more intensely colored foam of Example 1 is, therefore, especially useful as an insulating liner for fabrics; it is breathable, extra soft and further has excellent flame laminability.

EXAMPLE 2

A coarser cell deep black foam is produced by following the procedure of Example 1, except that the propoxylated polyether triol with a molecular weight of 3,000 is used, commercially known as LG–56, and dry nitrogen gas is flowed into the mixing chamber in the amount of 0.1 weight percent of the total reaction mixture. The nitrogen gas serves as a nucleating agent.

The procedures of Example 1 were followed and a coarse deep black, open foam was obtained, having a soft and pleasant feel. The foam had the following properties:

Density, lbs./ft.³ _____ 1.67
Percent resiliency _____ 44.5
Air permeability, cu. ft./min. _____ 9.70
Tensile strength, lbs./sq. in. _____ 16
Comp. sets:
    90% 22 hrs. in percent _____ 8.50
    90% 6 hrs. in percent _____ 5.0
Cell count, cells/lin. inch _____ 30
Clickability _____ Excellent This product is especially useful for fluid filtering purposes, such as in air conditioners, because of its high porosity.

EXAMPLE 3

A fine celled, substantially nonlustrous flesh colored foam was obtained by following the procedures of Example 1 and mixing the following formulation:

| | Parts by wt. |
|---|---|
| Poly(diethylene glycol adipate (MW=2000) | 100 |
| Tolylene diisocyanate (80/20) | 55 |
| Ethoxypropoxylated polysiloxane (viscosity at 25° C.=1700 cs.) (DS-192) | 4.38 |
| Water | 4.50 |
| Tertiary amine | 0.50 |
| Stannous octoate | 0.125 |
| Pigment dispersion (tricresylphosphate diluent) | 10.0 |
| Propoxylated glycerol (MW=3000) | 25 |
| Polydimethylsiloxane (viscosity=50 cs., at 25° C.) | 1.88 |

The samples of foam produced by the above formulation were tested and the data on physical properties are set down in the following table:

| | |
|---|---|
| Density | 1.63 |
| Percent resiliency | 36.0 |
| Air permeability, cu. ft./min. | 7.40 |
| Tensile strength, lbs./sq. in. | 23.6 |
| Elongation percent | 276 |
| Comp. sets: | |
| 90% 22 hrs. in percent | 4.9 |
| 90% 6 hrs. in percent | 4.0 |
| Cell count, cells/lin. inch | 40 |
| Clickability | Excellent |

The foam produced had a dull, pinkish flesh color and a soft and pleasant feel. The surface of the foam was substantially free of lustre, or of shine. Such a foam would especially be suitable for bandages and other body coverings because of excellent breathability.

The extremely soft open foam of Example 3 was compared with a commercially available soft grade foam prepared commercially by post-treatment using an explosive thermal technique for melting away the cell windows after production of the foam. The two foams had substantially the same permeability but the foam of Example 3 was found superior when tested for the presence of undesirable extractable material. The commercial foam was found to have 8.9% by wt. water-extractable material and 15.8% methylene chloride-extractable material. The product prepared according to the above example, however, had only 0.75% water-extractables and 2.8% methylene chloride-extractables. This is further confirmation of the advantages of the in situ open foam techniques according to the present invention compared to the previously commercially most useful post-treatment process. As explained above, this post-treatment must result in some chemical degradation of the polymer material forming the foam.

EXAMPLE 4

An unpigmented, natural colored foam was prepared by a batch process by mixing the following ingredients:

| Ingredients: | Parts by wt. |
|---|---|
| Polydiethylene glycol adpiate (MW=2000) | 80 |
| Propoxylated glycerol (MW=3000) | 20 |
| Ethoxypropoxylated polysiloxane (DC-192) (viscosity at 25° C.=1700 cs.) | 3.5 |
| Tertiary amine (in a dipropylene glycol solvent) | 0.4 |
| Tin octoate | 0.2 |
| Water | 3.6 |
| Tolylene diisocyanate (80/20) | 44 |
| Dimethyl siloxane polymer (viscosity at 25° C.=50 cs.) | 1.5 |

After completely mixing, the above formulation was poured into a cylindrical mold; the rise time for the foam was 50 sec. The mold was then placed into an oven maintained at 80° C. for an additional five minutes. There was substantially no settling of the foam once in the mold.

The foam so produced was soft, highly porous and substantially free of lustre or the shiners.

EXAMPLE 5

The following materials in the proportions indicated were simultaneously charged through separate inlets into a conventional mixer unit:

| Composition: | Parts by wt. |
|---|---|
| Polyol | 100 |
| (a) polydiethyleneglycol adipate (MW=2000) | 75 |
| (b) Propoxylated glycerol (MW=3500) | 25 |
| Tolylene diisocyanate (80/20) | 47 |
| Ethoxypropoxylated polysiloxane (viscosity at 25° C.=1700 cs.) (Dow Corning DC-192) | 3.5 |
| Organotin catalyst (in tricresylphosphate) | 0.2 |
| Amine activator | 0.4 |
| Water | 3.6 |
| Carbon black pigment (12% by weight pigment in tricresylphosphate) | 7.45 |
| Polydimethylsiloxane (viscosity=50 cs. at 25° C.) | 1.5 |

The mixing unit contained a 70 mm. mixing chamber; the mixer was operated at about 5400 r.p.m. and had a nozzle restriction of 20 millimeters.

The mixer nozzle fed to the center of a continuous conveyor belt mold, lined with polyethylene-coated release paper and having a substantially rectangular cross-section. The conveyor mold was operated at a conveyor angle of 1½°, a conveyor speed of 12.5 ft. per minute, and was approximately 200 feet long.

The bun removed from the conveyor was permitted to cool and was sliced into thin sheets for testing. The pore size was readily controlled in subsequent tests in the range of from 12 to 32 pores per inch either by controlling the nozzle restriction or by blending low pressure with high pressure TDI.

The rectangular bun of black foam thereby produced had the following properties:

| | |
|---|---|
| Specific gravity | 1.48 |
| Air permeability cu. ft. per minute | 18 |
| Pore size cells per inch | 22 |
| Tensile strength p.s.i. | 16 |
| Elongation before breaking percent | 301 |
| Tear strength p.s.i. | 3.25 |
| Resilience percent | 33.3 |
| ILD (2 inches 25%) | 13.5 |
| Compression set (90%, 22 hours) percent | 12.5 |

A comparison of the foam made above was made with a commercially available post-reticulated foam which showed substantially equivalent permeability and structural strength, but the foam of the present invention showed excellent "clickability," i.e. readily shaped by a die-cutting process, while the commercial foam was poorly "clickable." The commercial foam was prepared by a post-treatment method comprising explosive reticulation of a regular polyester grade foam.

EXAMPLE 6

The procedure of Example 1 was repeated metering the following ingredients to the mixing head at a through-put of 133 lb./min. polyester polyols.

| Ingredients: | Parts by wt. |
|---|---|
| Polyol | 100 |
| (a) Poly (diethyleneglycol adipate) (MW=2000) | 77.5 |
| (b) Polycaprolactone (MW=500) | 10 |
| (c) Propoxylyated triol (Thanol) (MW=3500) | 12.5 |

Ingredients: Parts by wt.
  Tolylene diisocyanate (80/20) _____ 49.6
  Ethoxypropoxylated polysiloxane (viscosity
    at 25° C.=1700 cs.)(DS-192) _____ 3.5
  Water _____ 2.5
  Polydimethylsiloxane (viscosity=50 cs. at
    25° C.) _____ 0.125
  Amine activator _____ 0.35
  Tin catalyst (1:1 in tricresylphosphate) ____ 0.3
  Carbon black dispersion (in water) _____ 1.55

The product was found to be a tougher, harsher feeling foam than Example 1. The use of the caprolactone polyester-type triol in place of a portion of the previous type of polyether triol imparted a "crisper hand" to the foam thus prepared. The foam bun prepared was peeled by conventional methods into sheets ¼-inch thick. Similar peelings were made of the buns formed in Example 1. One face of each sheet was flame-laminated by standard textile techniques to a nylon tricot fabric and the second face to a standard knit fabric. A standard commercial peeling grade polyester polyurethane foam sheet was also laminated by the same standard technique and the bond strengths of the laminate at each interface, warp and fill were determined several hours after formation of the bond. The bond strength of the foam of Example 1 which had a relatively soft "hand," was at least equal to that of the control sample of the standard polyester foam which had a much harsher hand. The bond strength of the foam of Example 6 was substantially greater than that of either of the first two. The foam of Example 6 had a slightly harsher hand than that of the standard grade polyester and greater than that of the foam of Example 1.

EXAMPLE 7

The procedure of Example 3 was repeated using the following formulation:

Parts by wt.
Poly (diethylene glycol adipate) (MW=2000) __ 100
Tolylene diisocyanate (80/20) _____ 55
Ethoxypropoxylated polysiloxane (viscosity at 25°
  C.=1700 cs.) (DC-192) _____ 4.38
Water _____ 4.50
Tertiary amine _____ 0.50
Stannous octoate _____ 0.125
Pigment dispersion, a hydroxyl terminated poly-
  ester of a glycol and a dicarboxylic acid _____ 1.4
Propoxylated glycerol (MW=3000) _____ 25
Polydimethylsiloxane (viscosity=50 cs., at 25°
  C.) _____ 1.88
Non-ionic foam stabilizer _____ (1)

¹ As indicated in Table 1.

Additional non-silicon foam stabilizers were added to the formulation in the proportion shown in Table 1. As shown, there was substantially no change in the properties of the soft cosmetic grade foam produced, but the ease of manufacturing was increased as the many known mechanical parameters became less critical.

TABLE 1

| Stabilizer | Pts./100 polyol | Air permeability (ft.³/min.) | Cell count |
|---|---|---|---|
| None (control) | | 7.9 | 40 |
| Tall oil acid ester of polyethylene glycol | 3.0 | 7.7 | 38 |
|  | 5.0 | 7.7 | 44 |
| Tricresyl phosphate | 10.0 | 7.2 | 40 |
| Poly(1,3-butylene glycol adipate)terminated with acetyl groups | 10.0 | 8.5 | 40 |

EXAMPLES 8 THROUGH 10

A batch process was used in preparing the following foams, mixing ingredients in a lab-size mixer and hand pouring into an open-top mold. The following compositions were prepared:

| Components | Parts by weight | | |
|---|---|---|---|
| | Ex. 8 | Ex. 9 | Ex. 10 |
| Poly(diethyleneglycol adipate) (MW-2,000) | 80 | 0 | 0 |
| Copolymer of diethylene glycol adipate and a minor portion of a triol ¹ | 0 | 80 | 0 |
| Polycaprolactone (viscosity-2,000 at 250° C.) | 0 | 0 | 80 |
| A propoxylated triol polyether (MW-3,500) | 20 | 20 | 20 |
| Exthoxypropoxylated polysiloxane (DC-192) (viscosity at 25° C.=1,700 cs.) | 1.5 | 1.5 | 1.5 |
| Dimethylsiloxane (viscosity at 25° C.=50 cs.) | 0.5 | 0.5 | 0.5 |
| Tolylene diisocyanate (80/20) | 44 | 44 | 44 |
| Amine initiator | 0.3 | 0.3 | 0.3 |
| Tin catalyst | 0.15 | 0.15 | 0.15 |
| Carbon black (aqueous suspension) | 6.2 | 6.2 | 6.2 |

¹ The polyester of Example 9 was more highly branched than that of Example 8.

The foamed products were permitted to set and cool to room temperature in the molds.

Each of the three types of polyester utilized in the above examples processed equally well and gave essentially equally open-pored foam products having a high permeability rating. Example 10 had the crispest hand, and Example 8 had the least crisp hand.

EXAMPLES 11 AND 12

The procedure of Example 8 was repeated for Examples 11 and 12 but the proportion of polyester to polyether polyols was varied as is shown in the following table:

| Components | Parts by weight | |
|---|---|---|
| | Ex. 11 | Ex. 12 |
| Poly(diethyleneglycol adipate) (MW=2,000) | 90 | 70 |
| A propoxylated triol (MW=3,500) | 10 | 30 |
| Ethoxypropoxylated polysiloxane (DC-192) (viscosity at) 25° C.=1,700 cs. in.) | 1.5 | 1.5 |
| Dimethylsiloxane (viscosity at 25° C.=50 cs.) | 0.5 | 0.5 |
| Tolylene diisocyanate (80/20) | 44 | 44 |
| Amine initiator | 0.3 | 0.3 |
| Tin catalyst | 0.15 | 0.15 |
| Aqueous carbon black suspension | 6.2 | 6.2 |

In each case a satisfactory substantially completely open, highly permeable foam was produced, but the foam of Example 12 was softer.

EXAMPLE 13

Example 11 was repeated but substituting a 65/35 isomer ratio tolylene diisocyanate for the 80/20 isomer ratio material. The 65/35 TDI foam of Example 13 was found to have a crisper hand than the foam of Example 11. The crispness of a foam is a measure of its harshness and it is especially desirable for textile grade materials.

EXAMPLE 14

Example 9 was repeated except that the ratio of polyether to polyester was 85:15 and a 65/35 isomeric ratio tolylenediisocyanate was utilized. This foam had an especially crisp hand, but was as open and as fine-pored as the foam of Example 9.

EXAMPLE 15

Example 8 was repeated, but substituting as the polyether triol one having a molecular weight of about 3000. This formulation produced a foam which was slightly coarser-celled than Example 8, but otherwise was a satisfactory open-celled foam.

EXAMPLE 16

Example 8 was repeated, but substituting as the polyether triol; a polyether-acrylonitrile-styrene terpolymer, having a molecular weight of about 4000. A highly permeable, substantially completely open foam with an extremely firm hand was obtained having excellent permeability.

EXAMPLE 17

Example 8 was repeated, but changing the proportion of polyester utilized to 65 parts and polyether utilized to 35 parts. An open foam having a firm hand was obtained.

EXAMPLE 18

The procedure of Example 8 was repeated, but substituting as the polyether triol, a hydrophilic polyether triol having a high oxyethylene content and having a molecular weight of about 4000. This formula produced a useful, highly permeable, substantially completely open foam, having increased hydrophilicity.

EXAMPLES 19 THROUGH 21

The procedure of Example 8 was repeated with the following formulations:

| Components: | Parts by wt. |
|---|---|
| Poly(diethyleneglycol adipate) (MW=2000) | 80 |
| A polyether triol (MW=3500) | 20 |
| Organic silicon emulsifier | (1) |
| Dimethylsiloxane polymer (viscosity at 25° C.=50 cs.) | 0.5 |
| Tolylene diisocyanate (80/20) | 44 |
| Amine initiator | 0.3 |
| Tin catalyst | 0.15 |
| Carbon black (aqueous suspension) | 6.2 |

[1] As shown in table.

The following emulsifiers were utilized in the above formulation:

| Example | Organic silicon emulsifier | Parts by weight |
|---|---|---|
| 19 | A non-hydrolyzable propoxyethoxylated polysiloxane.[1] | 1.5 |
| 20 | A hydrolyzable ethoxypropoxylated polysiloxane[2] | 1.5 |
| 21 | Silyl amine.[3] | 1.5 |

[1] Sold by Union Carbide Corp. as L–550. Typical physical properties are: viscosity, at 25° C., 1800 cst.; color, Gardner, less than 2, aqueous solution viscosity, 40% in water at 25°C., 65 cst.
[2] Sold by Union Carbide Corp. as L–520 see Product Information brochure F–42646. Typical physical properties are: viscosity at 25° C., 1,100 cst.; color, Gardner, 1; specific gravity, 25/25° C., 1.03.
[3] Sold by Mobay Chemical Co. as E–9400. Typical physical properties are: viscosity, 25° C., 4 cps; density 20/4° C., 0.88; flash point, 60–62° C.

In each case a useful, highly permeable, substantially completely open foam was produced.

EXAMPLES 22 THROUGH 26

The procedure and formulation of Example 8 was repeated, but the viscosity of the dimethyl silicone hydrophobic anti-foaming agent was varied as shown in table.

| Examples: | Viscosity of dimethyl siloxane polymer at 25° C. (cs.) |
|---|---|
| 22 | 10 |
| 23 | 20 |
| 24 | 50 |
| 25 | 100 |
| 26 | 500 |

In each case, a satisfactory, substantially completely open, highly permeable foam was produced having substantially the same properties as the foam of Example 8.

EXAMPLE 27

The procedure of Example 1 was followed using the following foaming formulation:

| Components: | Parts by wt. |
|---|---|
| Polydiethyleneglycol adipate (MW=2000) | 80 |
| Propoxylated glycerol (MW=3000) | 19 |
| Tolylene diisocyanate (80/20) | 40 |
| Ethoxypropoxylated polysiloxane (DC–192) (viscosity at 25° C., 1700 cs.) | 1.5 |
| Tin catalyst | 0.2 |
| Amine initiator | 0.3 |
| Aqueous carbon black pigment | 5.5 |
| Dimethyl siloxane polymer (viscosity @ 25° C.=50 cs.) | 1 |

The rectangular buns formed were peeled to ¼ in. thickness. One face of samples of the peeled foam were then flame-laminated by standard textile technique to a nylon fabric and the second face to standard nylon knit fabric.

Standard commercial peeling grade polyester urethane foam sheets of the same thickness were also flame-laminated to the same textile materials using the same standard techniques. The laminates were then tested for bond strength for each interface, warp and fill, immediately after lamination, after five wash cycles, and after five dry-cleaning cycles. The results are as follows:

| Test conditions | Control polyester | Example 27 |
|---|---|---|
| Before testing: | | |
| Avg. bond, ozs.-Warp/fill: | | |
| Knit | 8.2/7.7 | 13.0/9.0 |
| Tricot | 8.0/5.7 | 9.5/8.5 |
| After 5 washes: | | |
| Delamination | (1) | None |
| Puckering | | None |
| Avg. bond, ozs.-warp/fill: | | |
| Knit | 8.3/6.7 | 11.5/8.0 |
| Tricot | | 8.5/5.5 |
| After 5 dry cleaning cycles: | | |
| Delamination | None | None |
| Puckering | None | None |
| Knit | 5.0/4.7 | 11.0/8.0 |
| Tricot | 1.7/1.7 | 7.0/6.0 |

[1] 50% tricot.

As can be seen, the foam prepared in accordance with the present invention in addition to being open-celled, and, therefore, having far improved permeability, making it a much more comfortable, breathable textile fabric for the wearer, forms a stronger interface bond with the fabrics compared to the standard polyester grade foam. In addition, the foam of Example 27 after five washings, did not delaminate, but 50% of the tricot laminations for the control sample did delaminate. Further, Example 27 maintained its bond strength after dry-cleaning as compared to the control polyester foam laminate.

The patentable embodiments of this invention which are claimed are as follows:

1. In the process for the preparation of a flexible cellular solid urethane polymer comprising the reaction of an organic polyisocyanate with a polyhydric polyester and water, the improvement which comprises: the substitution of from about 5 percent to about 35 percent by weight of the polyhydric polyester by an equal weight of an isocyanate-reactive polyether polyol; and the addition to the reaction mixture of a hydrophilic organosilicon foam-stabilizing emulsifier-surfactant designed and adapted for use in the preparation of urethane polymer foam from a polyether polyol and an organic polyisocyanate, and a hydrophobic, anti-foaming organo-silicon compound; this improvement resulting in the formation of a nonlustrous, substantially membrane-free, foam.

2. The process of claim 1 wherein the cellular solid is prepared by the one-shot foaming method.

3. The process of claim 1 wherein the foam-stabilizing emulsifier-surfactant is an organo silicon polymer containing a plurality of silicon atoms and a long chain hydrophilic group.

4. The process of claim 3 wherein the emulsifier-surfactant is a copolymer of a polysiloxane and a polyalkylene ether.

5. The process of claim 4 wherein the polysiloxane polyoxyalkylene copolymer contains at least about 15 oxyalkylene units having the structure $(OC_pH_{2p})$ wherein $p$ is from two to about six.

6. The process of claim 5 wherein $p$ is an average value derived from a mixture of oxyalkylene groups wherein $p$ equals two and oxyalkylene groups wherein $p$ equals three or four.

7. The process of claim 5 wherein the emulsifier-surfactant is a polymer which has a backbone formed of siloxane groups, to which is attached, as a pendant group, at least one polyoxyalkylene group.

8. The process of claim 5 wherein the emulsifier surfactant is a polymer which has a backbone of alternating siloxane and oxyalkylene groups.

9. The process of claim 8 wherein the siloxane units have the formula:

wherein R and R' are hydrocarbyl groups.

10. The process of claim 9 wherein R and R' are alkyl groups containing from 1 to about 4 carbon atoms.

11. The process of claim 10 wherein R and R' are methyl groups.

12. The process of claim 5 wherein the polyoxyalkylene group is formed of a mixture of oxyethylene units and oxypropylene units such that $p$ has an average value between two and three.

13. The process of claim 1 wherein the anti-foaming compound is a polysiloxane containing the recurrent group —(RR'SiO)— wherein the R and R' groups in the polymer are hydrophobic organic groups connected to the silicon atom through a carbon atom.

14. The process of claim 13 wherein the organic groups, R and R' are hydrocarbyl groups.

15. The process of claim 14 wherein the polysiloxane is a poly(dialkyl siloxane).

16. The process of claim 15 wherein the polysiloxane is poly(dimethyl siloxane).

17. The process of claim 1 wherein the reaction takes place in the presence of a particulate pigment.

18. The process of claim 17 wherein the pigment is carbon black dispersed in an aqueous medium.

19. The process of claim 17 wherein the pigment is dispersed in a nonaqueous medium.

20. The process of claim 1 wherein the emulsifier-surfactant is present in the amount of from about 0.1 to about 5 parts per hundred parts of total polyether and polyester.

21. The process of claim 20 wherein the emulsifier-surfactant is present in an amount of from about 1.0 to about 5 parts per hundred parts of total polyhydric reactants.

22. The process of claim 1 wherein the organo-silicon type anti-foaming compound is present in an amount of from about 0.1 to about 3 parts per hundred parts of total polyhydric reactants.

23. A nonlustrous, substantially open flexible urethane polymer foam, substantially free from membranes or the shattered remains of membranes, the foam comprising a mixed polyester-polyether urethane polymer prepared from a polyester polyol and a minor quantity of a polyether polyol and water, and containing the residues of a hydrophilic organo-silicon emulsifier surfactant and of a hydrophobic, anti-foaming organo-silicon compound.

24. The urethane polymer foam of claim 23 wherein the anti-foaming compound is a polysiloxane comprising of the units—$(R_2SiO)$—wherein the R groups attached to each silicon atom are hydrophobic organic groups connected to each respective silicon atom through a carbon atom.

25. The urethane polymer foam of claim 24 wherein the organic groups, R, are hydrocarbyl groups.

26. The urethane polymer foam of claim 23 wherein the foam-stabilizing emulsifier-surfactant is a polymer containing a plurality of silicon atoms and a long chain hydrophilic group.

27. The urethane polymer foam of claim 23 comprising in addition a particulate pigment.

28. The urethane polymer foam of claim 27 wherein the pigment is carbon black.

References Cited

UNITED STATES PATENTS 3,404,105 10/1968 Rossmy _____ 260—2.5 AH
3,454,504 7/1969 Munai et al. _____ 260—2.5 AG DONALD E. CZAJA, Primary Examiner M. J. WELSH, JR., Assistant Examiner U.S. Cl. X.R.

260—2.5 AG, 2.5 AK